Oct. 20, 1964 G. W. ELMEN ETAL 3,153,764

MAGNETIC AMPLIFIER

Filed June 20, 1945 5 Sheets-Sheet 1

Inventors
G. W. ELMEN
E. A. GAUGLER

By Ralph L Chappell

Attorney

MAGNETIC AMPLIFIER

Filed June 20, 1945 5 Sheets-Sheet 2

Inventors
G. W. ELMEN
E. A. GAUGLER

By Ralph L Chappell

Attorney

Oct. 20, 1964 G. W. ELMEN ETAL 3,153,764

MAGNETIC AMPLIFIER

Filed June 20, 1945 5 Sheets-Sheet 3

Inventors
G. W. ELMEN
E. A. GAUGLER

By Ralph L. Chappell

Attorney

MAGNETIC AMPLIFIER

Filed June 20, 1945

Inventors
G. W. ELMEN
E. A. GAUGLER
By Ralph L Chappell
Attorney

Inventors
G. W. ELMEN
E. A. GAUGLER

By Ralph L Chappell
Attorney

United States Patent Office 3,153,764
Patented Oct. 20, 1964

3,153,764

MAGNETIC AMPLIFIER

Gustaf W. Elmen, 104 High St., Leonia, N.J., and Edward A. Gaugler, 1740 Preston Road, Alexandria, Va.

Filed June 20, 1945, Ser. No. 600,629
4 Claims. (Cl. 330—8)
(Granted under Title 35, U.S. Code (1952), sec. 266)

This invention relates generally to signal amplifiers and more particularly to a highly stabilized and sensitive magnetic amplifier adapted to convert weak signal currents to electrical impulses of relatively great amplitude.

An amplifier of this character is well adapted for use in generating electrical impulses of sufficient amplitude to operate cold cathode type, gaseous discharge tubes as employed, for example, in a mine firing system in which the impulses are generated in response to small amplitude, low frequency currents induced in the pickup coil of a magnetic mine as the magnetic field within the vicinity of the mine is altered in accordance with the magnetic signature of a vessel moving with respect thereto. Such a mine firing system, for example, is disclosed in the copending application of Whitman D. Mounce et al. for Mine Firing Control System, Serial No. 594,133, filed May 16, 1945.

More specifically, the present invention contemplates the provision of a magnetic amplifier of the aforedescribed type in which electrical impulses of opposite polarities are generated selectively in accordance with the polarity of signal currents applied thereto and amplified thereby.

The present invention further contemplates the provision of a stabilized magnetic amplifier having matched parts of novel construction which renders the operational characteristics of such parts substantially identical and prevents changes in the characteristics of one part relative to the other in response to variations in the operating conditions to which the amplifier may be subjected in use, or by reason of shocks received during transportation and handling and upon impact with the water when a mine employing the amplifier is launched from an aircraft in flight, or by reason of countermining shocks received through the surrounding water.

Other features of the magnetic amplifier reside in the substantial elimination and control of deleterious effects due to eddy currents and the utilization and control of inherent regenerative effects whereby a highly stabilized and sensitive amplifier is provided.

In accordance with the arrangement of the present invention, a pair of matched transformers each having a closed core preferably formed as a toroid with primary and secondary windings disposed thereabout provide the amplifying function of the magnetic amplifier. The primary windings are connected in series so as to be excited by the same impulse of current received from a relaxation oscillator which is adapted periodically to supply electrical impulses of predetermined wave form whereby the toroidal cores are driven through identical hysteresis loops of predetermined shape in response to the exciting current.

The secondary windings are connected in series opposing such that the voltages respectively induced therein by the exciting or primary current impulses substantially cancel when the cores are equally magnetized thereby and serve as output windings for developing a difference or output voltage thereacross when the relative magnetization of the cores is unbalanced, for example, by a D.C. signal current passed through the windings, the secondary windings for this latter purpose also serving as input windings.

The secondary windings further serve as compensating windings to effect equal magnetization of the cores in the event that the transformers are not sufficiently matched to produce substantially identical hysteresis loops in response to the exciting current. This is accomplished by means of a magnetic bias circuit including means settable at will for causing a D.C. current to pass selectively in either direction through the secondary windings, thereby to bias the cores magnetically in opposite directions sufficiently to cancel any difference which may exist in the secondary voltages by reason of any dissimilarities in the cores or windings of the toroids.

The cores are formed of insulated laminations of magnetic material of high permeability and resistance whereby the material affords a high rate of change of total flux for small field changes and eddy current losses are reduced to a minimum. Thus, by reason of such construction a small change in the magnetization of one core relative to the other in response to a signal current in the order of one microampere causes the hysteresis loops of the cores to be shifted in phase and thereafter changed in shape relative to each other sufficiently to produce a relatively large difference in the relative rate of change of flux in the cores such that the secondary voltages are unbalanced sufficiently to cause current in the order of milliamperes to flow in an output circuit including the secondary windings. The shift in phase of the loops referred to herein is defined as the changes in the value of the magnetizing force H of one loop relative to the value of the other with reference to any instantaneous value of the primary current.

The secondary current is utilized to aid the signal current in producing a further gradual shift in phase in the hysteresis loops and further change in shape thereof upon successive impulses of the relaxation oscillator. Thus, regeneration is obtained resulting in a greater unbalance of the secondary voltages. The wave form of the primary exciting current is so arranged and the impedance of the output circuit is so selected, however, that a gradually increasing phase shift is produced between the primary exciting and secondary currents such that further change in the loops is terminated whereby a maximum amount of regeneration is utilized for each value of signal current applied without leading to an unstable output circuit condition. Thus, an output voltage of relatively large amplitude proportional to the magnitude of the signal current and of polarity corresponding to the polarity of the signal current is produced across the combined secondary windings in response to flow of the signal current therethrough.

The output circuit includes suitable means such as a coupling transformer for coupling the magnetic amplifier to a circuit such, for example, as the aforesaid mine firing circuit adapted to be controlled by the voltage impulses generated by the combined secondary windings of the output circuit. The output circuit also includes means settable at will for increasing the impedance thereof above that providing maximum regeneration, thereby to provide means for adjusting the sensitivity of the amplifier.

Certain of the magnetic amplifiers heretofore devised for the purpose comprise matched transformers having ribbon or tape wound cores of magnetic material of high permeability. Such transformers have not been found to be entirely satisfactory in service for the reason that the magnetic characteristics of the cores are altered when the transformers are subjected to stresses resulting, for example, from shocks received thereby and from strains set up in the convolutions of the magnetic ribbon or tape comprising the cores as the convolutions change position relative to each other in response to variations in temperature encountered in the use of the transformers.

These difficulties have been overcome substantially in the design of the matched transformers of the present invention by the provision of closed magnetic circuits comprising toroidal cores formed of ring-shaped laminations inherently rigid in construction and by the provision of containers for the laminations which permit a degree of freedom of movement therein in response to temperature changes within a range of temperatures to which the amplifier may be subjected in use. Moreover, the loose mounting of the laminations permits the use of a suitable fluid within the containers whereby pressure on the laminations is applied uniformly thereon by way of the fluid and permanent strain therein is thus avoided.

It is a broad object of the invention, therefore, to provide a new and improved magnetic amplifier whose operational characteristics are not affected by reason of shocks received by the amplifier in the use thereof or by reason of temperature variations encountered under different conditions of use thereof.

Another object of the invention is to provide a magnetic amplifier adapted to convert weak signal currents to electrical impulses of relatively great amplitude proportional to the magnitude of the signal currents and corresponding selectively to the polarity thereof.

Another object is to provide a stabilized magnetic amplifier in which inherent regenerative effects are utilized to increase the gain thereof.

Another object is to provide a sensitive magnetic amplifier having matched transformers in which the cores thereof are constructed so as to reduce to a minimum the deleterious effects of eddy currents therein and to render the magnetic characteristics of the cores substantially uniform and identical under all conditions of service.

An additional object is to provide a magnetic amplifier having matched transformers in which certain of the windings are utilized in magnetically biasing the cores of the transformers selectively in either direction thereby to compensate for inequalities in the electrical and magnetic characteristics thereof.

Still other objects, advantages and features of the present invention not specifically stated hereinabove are those inherent in or implied from the novel combination, construction and arrangement of parts as will be come fully apparent with the following detailed description thereof taken in connection with the accompanying drawings wherein:

FIG. 8 is a diagrammatic view of a complete electrical mine firing circuit including the magnetic amplifier of the present invention;

Figure 1:
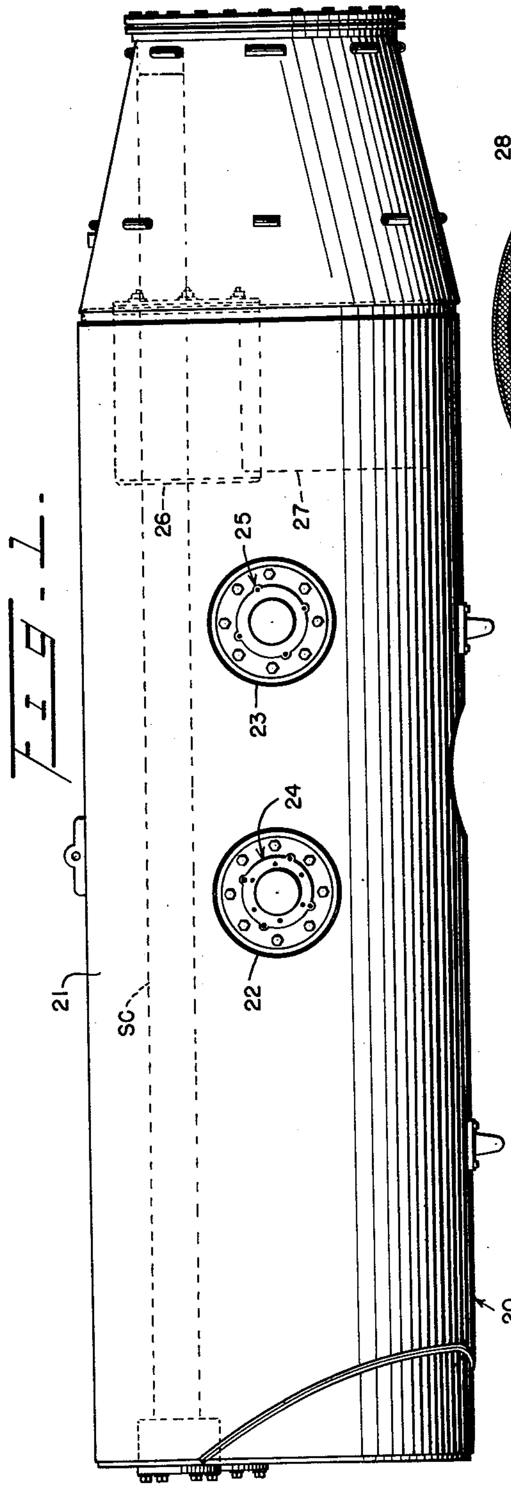
FIG. 1 is a plan view of a complete mine adapted to be planted from an aircraft in flight and suitable for use with the magnetic amplifier of the present invention.
Figure 5:
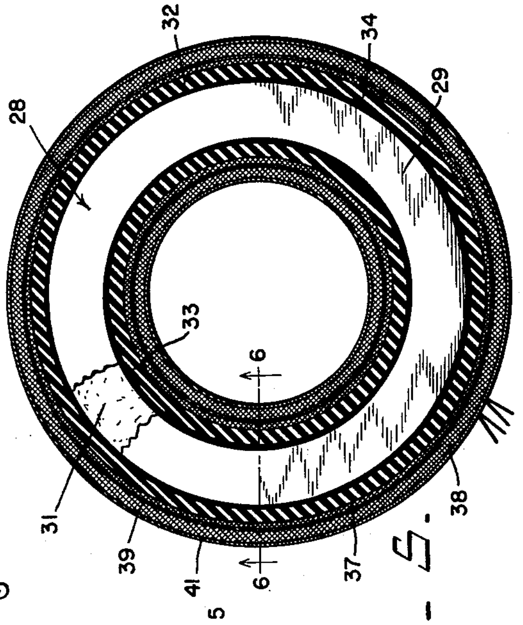
FIG. 5 is a sectional view of the toroid as seen along the line 5—5 of FIG. 4.
Figure 4:
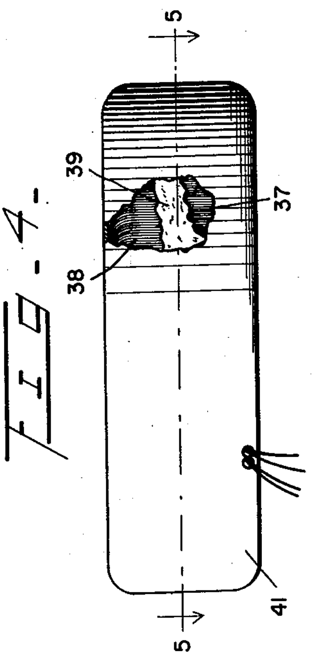
FIG. 4 is a view in elevation of one of the toroids, certain portions thereof being broken away to illustrate the construction.
Figure 2:
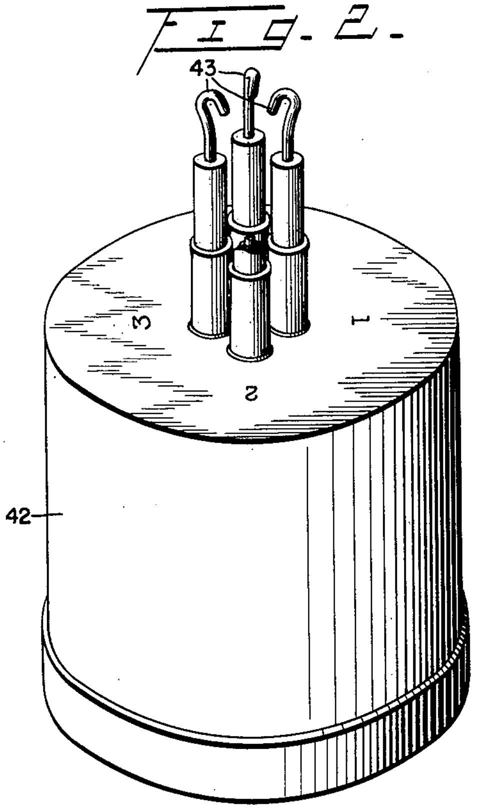
FIG. 2 is a view in perspective of a unit comprising a pair of matched transformers or toroids constructed in accordance with a preferred embodiment of the invention.
Figure 3:
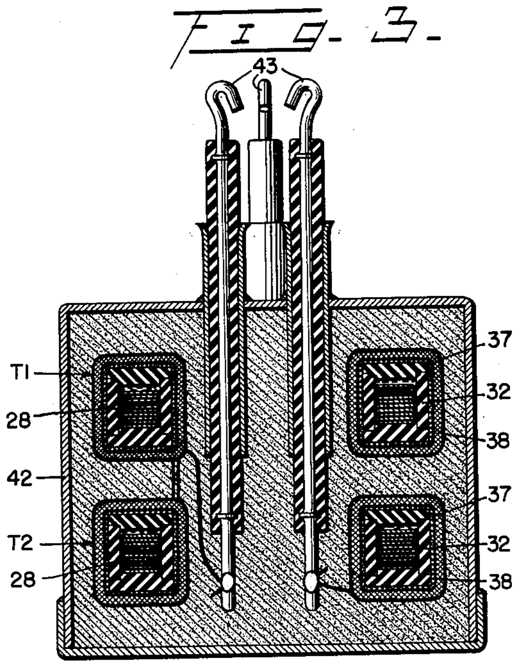
FIG. 3 is a sectional view of the unit shwn in FIG. 2o taken substantially axially thereof.
Figure 7:
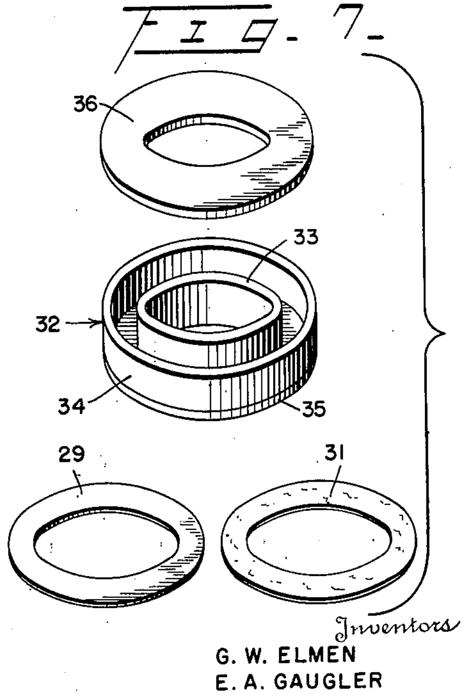
FIG. 7 is an exploded view in perspective of several of the component parts comprising a toroid.
Figure 6:
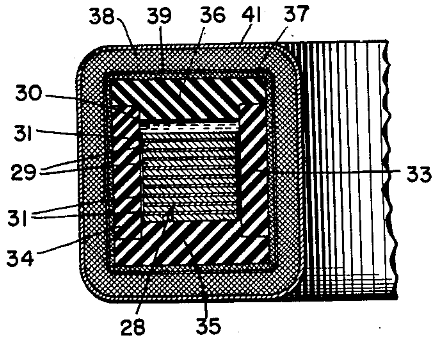
FIG. 6 is a fragmentary sectional view of the toroid as seen along the line 6—6 of FIG. 5.
Figure 6:
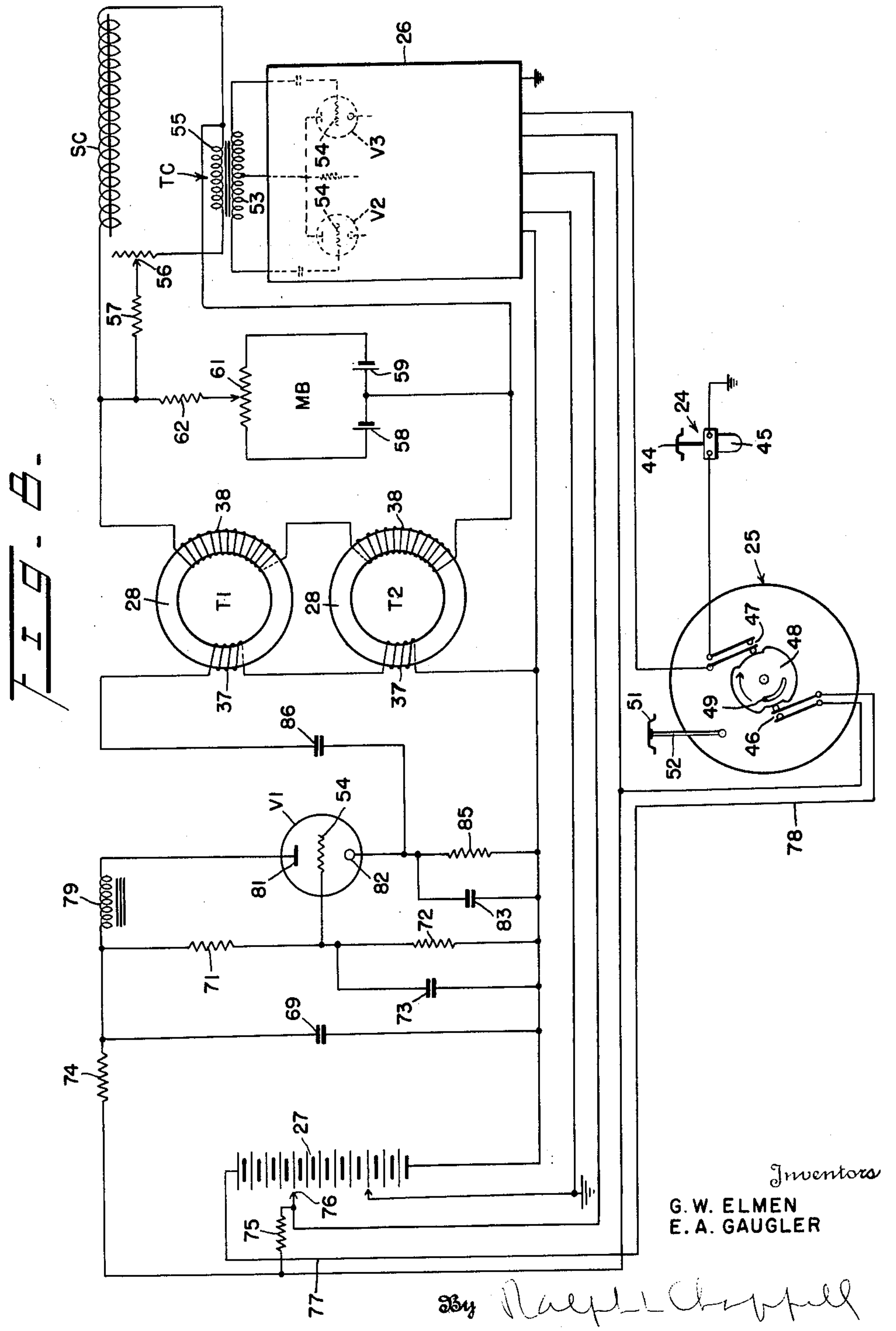

Referring now to the drawings for a more complete understanding of the invention and more particularly to FIG. 1 thereof, the numeral 20 generally designates an influence type magnetic marine mine adapted to be launched into a body of water from an aircraft in flight. The mine includes a casing 21 having an explosive charge contained therein of sufficient size to impart negative bouyancy to the mine whereby the mine is caused to come to rest on the bed of the body of water and to cause sufficient explosive damage to disable or destroy a vessel moving within the vicinity thereof.

The mine casing 21 comprises a pair of reentrant or well portions 22 and 23 in which are mounted in watertight relation therewith a hydrostatic extender mechanism generally designated 24 and a clock mechanism generally designated 25 respectively. As will appear in greater detail hereinafter, hydrostatic mechanism 24 is adapted to operate in response to the pressure of the surrounding water and cause an electroresponsive detonator to be moved into operative relation with respect to the explosive charge as the mine descends through the water. Similarly, operation of clock mechanism 25 is initiated in response to pressure of the surrounding water, thereby to electrically connected the detonator to a mine firing mechanism 26 therefor and to connect the mechanism to a suitable source of energy, here shown to be a battery 27.

Operation of the mine firing mechanism is initiated by signal currents received from a suitable pickup or search coil generally designated by the letters SC. Search coil SC comprises a relatively large number of turns of fine wire arranged about an elongated magnetic core and is caused to generate small amplitude, low frequency electrical currents of opposite polarity selectively in accordance with increases and decreases in the strength of the magnetic field in the vicinity of the search coil as controlled by the magnetic signature of a vessel moving with respect thereto.

The signal currents generated by the search coil SC are converted into electrical impulses of relatively great amplitude by means of a magnetic amplifier comprising a pair of matched transformers or toroids generally designated T1 and T2 and disclosed structurally in FIGS. 2 through 7. Each of the toroids comprises a closed core 28 having a plurality of ring-shaped laminations 29. Laminations 29 are formed of a suitable magnetic material preferably of high permeability such, for example, as a material known in the trade as 4 molybdenum permalloy and composed approximately of 79% nickel, 17% iron, and 4% molybdenum. Laminations 29 preferably are selected from the same melt of permalloy and heat treated in a special manner to insure uniform magnetic characteristics. The laminations also preferably are formed of a material having a high resistance in order that eddy currents may be reduced to a minimum. For such latter purpose, the laminations also are made as thin as engineering practice will permit, a suitable thickness of the laminations being in the order of 6 to 10 thousandths of an inch. Adjacent laminations are separated by a suitable ring-shaped strips of insulation 31 which may be formed of paper having a thickness in the order of 1 thousandth of an inch, thereby further to prevent eddy current losses in the cores.

The laminations and insulation separators therefor are loosely retained within a toroidal-shaped container 32 formed of a suitable material such, for example, as phenol fiber and fabricated into the form shown in any convenient manner. Container 32 preferably is formed of sufficient size to permit the laminations to move several thousandths of an inch both radially and axially therein and formed in such a manner as to permit a suitable semi-fluid or fluid 30 such, for example, as cable oil to seep thereinto. In the arrangement shown, container 32 comprises inner and outer annular members 33 and 34 and side members 35 and 36 which are fitted into registered engagement with the annular members whereby the oil is permitted to seep into the container by way of the joints between the several members thereof.

Each of the cores of toroids T1 and T2 has primary and secondary windings 37 and 38 respectively disposed thereabout and insulated from each other by suitable electrical insulation 39 disposed therebetween and bound outwardly by suitable insulating tape 41. Windings 37 and 38 each preferably comprise an optimum number of turns as affects the wave form of the exciting current and matching of the secondary windings and the search coil SC.

Toroids T1 and T2 are potted as a unit in the same non-magnetic container 42 having a quantity of potting sand disposed therein and a plurality of insulated terminals 43 brought outwardly therefrom. Primary windings 37 are connected series aiding and the free ends thereof connected to a pair of terminals 43. Similarly, secondary windings 38 are connected series opposing and the free ends thereof connected to the remaining pair of terminals 43. In practice, the sand and toroids within container 42 are vacuum dried and impregnated with cable oil which thereafter seeps into the fiber containers 32.

The magnetic characteristics of permalloy are altered when the material is strained. When this condition occurs, the magnetic amplifier is incapable of operating in the manner intended. By reason of the foregoing construction of the toroids, however, any pressure thereon resulting from shocks received thereby is uniformly distributed by the oil to the several laminations within the containers 32 therefor, thus avoiding any permanent strain therein. Moreover, freedom of movement afforded the laminations within the containers individual thereto prevents strain in the laminations by reason of contraction or expansion of the containers resulting from variations in temperature or by reason of contraction and expansion of the laminations due to magnetostriction. The insulation separators also serve as a means for conveying the oil between the laminations and further serve as cushions in preventing the transmission of shock therebetween. Furthermore, by reason of this core construction eddy current losses are held to a minimum, the oil between the laminations serving to increase the insulation therebetween, thereby to effect a greater degree of sensitivity of the magnetic amplifier for reasons to become more fully apparent as the description proceeds.

Referring now to FIG. 8 in which a complete electrical circuit for mine 20 is diagrammatically illustrated, it will be seen that the extender mechanism 24 comprises a diaphragm 44 adapted to be moved in response to the pressure of the surrounding water thereby to move an electroresponsive detonator 45 interconnected therewith into operative relation with respect to the explosive charge of the mine. For further reference to an extender mechanism suitable for the purpose reference may be made to the copending application of Albert H. Sellman et al. for Hydraulic Mechanism, Serial No. 432,454, filed February 26, 1942.

Clock mechanism 25 comprises a pair of switches 46 and 47 adapted to be closed in sequence by a cam 48 as the cam rotates in the direction of the arrow to engage a stop pin 49. The cam is adapted to be driven by a spring and escapement mechanism whose operation is initiated by a suitable clock starter mechanism comprising a flexible diaphragm 51 which operates in response to the pressure of the surrounding water to move a plunger 52 into a position to rotate the escapement mechanism. Clock mechanism 25 preferably is of a type disclosed in the copending application of James B. Glennon et al. for Firing Mechanism for a Submarine Mine, Serial No. 395,230, filed May 26, 1941.

Firing mechanism 26 may be of a type disclosed in the aforesaid copending application of Whitman D. Mounce et al. It suffices therefore, for purposes herein, merely to state that the mechanism comprises a pair of control channels each including a plurality of electronic discharge devices of a gaseous trigger tube type, one tube of each channel being shown and designated V2 and V3 respectively. By means of these tubes operation of the channels is initiated selectively in response to voltage impulses of opposite polarities received from the magnetic amplifier by way of coupling transformer TC thereof, a voltage impulse of one polarity appearing in secondary winding 53 of transformer TC being applied to the control grid 54 of tube V2 thereby to initiate operation of the control channel individual thereto and a voltage impulse of opposite polarity being applied to the control grid 54 of tube V3 thereby to initiate operation of the control channel individual thereto.

Biasing potential for firing mechanism 26 is supplied by the multi-tap battery 27. Bias potential of sufficient value to arm the mechanism completely, however, is not applied thereto until the clock mechanism 25 has operated to close switch 46 thereof, thereby to apply full battery potential to the mechanism. Switch 47 of the clock mechanism thereafter is closed to connect the detonator 45 electrically to the mechanism.

The control channels, when operated in predetermined time spaced relation, are adapted to produce additively a voltage which in turn is adapted to initiate operation of a mine firing control circuit including the detonator 45, thereby to ignite the detonator and fire the explosive charge associated therewith.

The magnetic amplifier comprises matched transformers or toroids T1 and T2, the primary windings 37 of which are excited by the same current impulse received from any suitable means such, for example, as a relaxation oscillator comprising a thyratron V1 of a trigger tube type together with the circuit elements associated therewith.

The magnetic amplifier also includes the coupling transformer TC whose primary winding 55 is connected in series with an adjustable resistor 56 and a stabilizing resistor 57 across the secondary windings 38 of the toroids whereby the output voltage impulse of the magnetic amplifier is caused to appear in the windings of the coupling transformer, these windings preferably having a step-up turn ratio thereby to increase the overall gain of the amplifier. Resistor 57 is selected as the minimum value of impedence in the output circuit to permit the maximum amount of regeneration which may be obtained in the amplifier without leading to an unstable output circuit condition. Adjustable resistor 56 serves variably to increase the impedance of the output circuit above that introduced therein by resistor 57 and thus provides a means for adjusting the gain or sensitivity of the amplifier. These resistors control the value of the secondary current in the output circuit for a given value of the voltage across the combined secondary windings and thus control the regeneration which is produced by the secondary current, as will appear more fully hereinafter.

The magnetic amplifier further comprises a magnetic bias circuit MB for equalizing the magnetization of cores 28 of the matched toroids in the event that identical hysteresis loops are not obtained therefrom in response to the exciting current supplied by the relaxation oscillator or in the event that dissimilarities exist in the cores and coils comprising the toroids such that a voltage appears across the combined secondary windings under no signal conditions. The magnetic bias circuit is a closed circuit including a pair of batteries 58 and 59 connected in series with an adjustable resistor 61.

Circuit MB is connected as a voltage divider or bridge circuit across the secondary windings 38 in series with a suitable current limiting resistor 62. Thus, adjustment of the wiper of resistor 61 to the left as viewed in FIG. 8 causes a small D.C. current to flow from battery 58 through resistors 61 and 62 and thence through windings 38 of toroids T1 and T2 back to battery 58, thereby to cause the magnetization of one core 28 of toroids T1 and T2 to be increased and that of the other to be decreased. Similarly, adjustment of the wiper of resistor 61 to the right as viewed in FIG. 8 causes a D.C. current to flow from battery 59 through windings 38 of toroids T2 and T1 and thence by way of resistors 62 and 61 back to battery 59, thereby to cause the magnetization of the other of cores 28 to be increased and the magnetization of the aforesaid one of the cores to be decreased.

Search coil SC also is connected across secondary windings 38 of toroids T1 and T2 whereby signal currents generated by the search coil are caused to flow selectively in either direction through the secondary windings in accordance with the polarity of the signal currents as controlled by the magnetic signature of a vessel moving within the vicinity of the mine and detected by the search coil. The secondary windings in such case serve as input windings in which the signal currents passing therethrough effect a change in the magnetization of the cores 28 of the toroids relative to each other such that the hysteresis loops of the cores are shifted in phase and thereafter changed in shape in response to the next succeeding exciting current impulse passing through the primary windings 37 of the toroids. The shift in phase and change in shape of the hysteresis loops causes a difference or output voltage to appear across the opposedly connected secondary windings. The relatively great amplitude of the output voltage obtained from the magnetic amplifier, however, is the result of regeneration of the secondary currents obtained during each impulse of primary current and the gradual shift in phase and change in shape of the loops from impulse to impulse following initial unbalancing of the cores and shift in phase of the hysteresis loops, as will presently appear.

It will be understood that the sensitivity and amplification attained in the magnetic amplifier is the result of a plurality of interlocking characteristics and operations thereof as controlled by the circuit parameters employed, the magnetic characteristics of the core material selected, the construction of the cores as affecting the eddy currents induced therein and the susceptibility of the core material to permanent strain, the shape of the primary winding current impulse in controlling the shape of the hysteresis loops obtained and control of the inherent regenerative effects resulting from a shift in phase and change in shape of the loops.

Figures 14, 15, 16, 17:
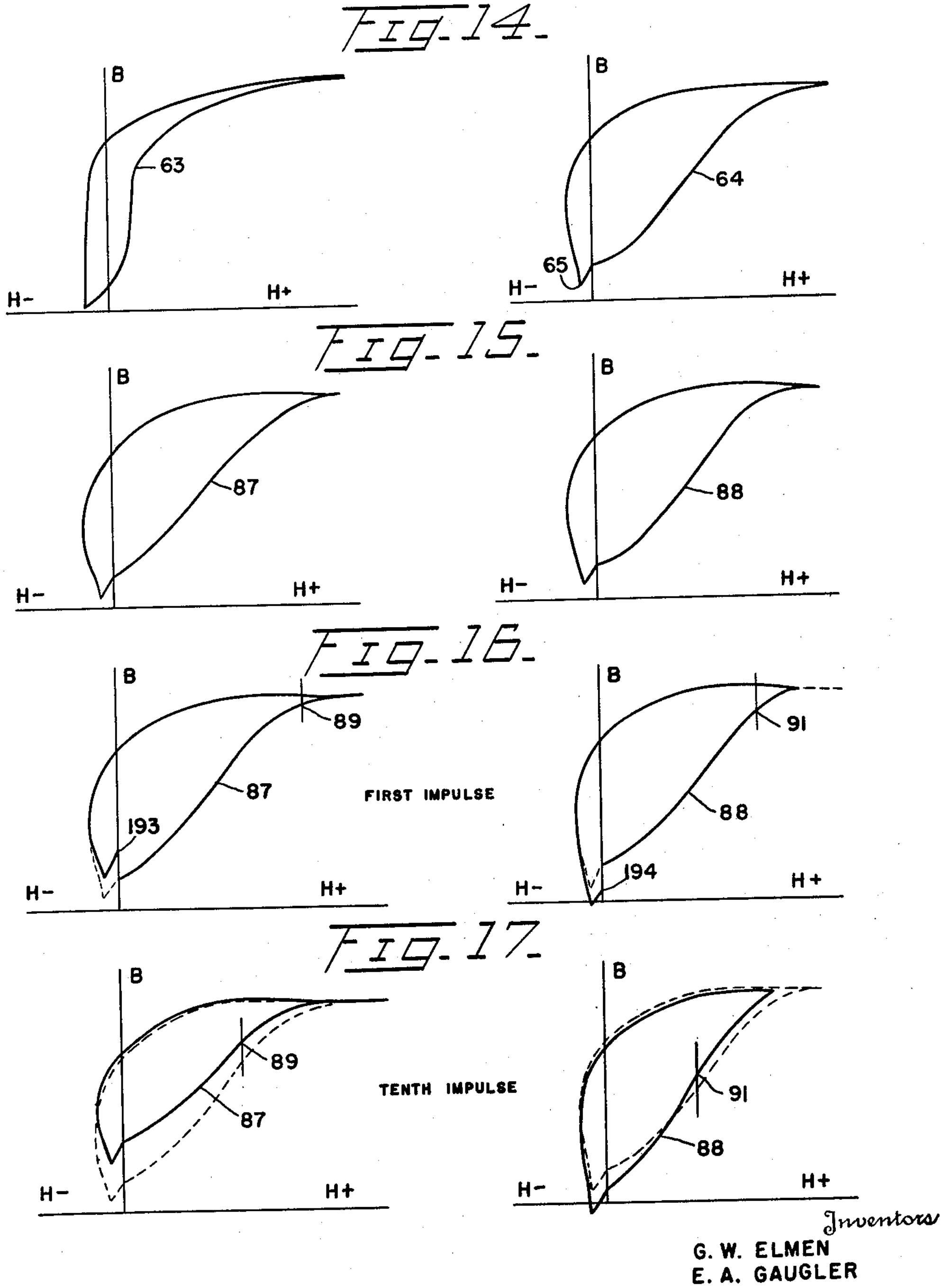
FIG. 14 is a diagrammatic view of a pair of hysteresis loops which illustrate comparatively the effects of eddy currents in the cores.
FIGS. 15 through 17 illustrate diagrammatically the relative changes in the hysteresis loops of the matched toroids upon successive impulses of exciting current when a signal is applied to the magnetic amplifier.

Referring now to FIG. 14, a hysteresis loop designated 63 is shown which illustrates the shape of a theoretical hysteresis loop which would be obtained from a core formed of 4 molybdenum permalloy, for example, if the effects of eddy currents could be entirely eliminated therefrom. It will be noted that loop 63 comprises relatively steep portions adjacent the B axis, and, accordingly, small changes of H within this region of the loop provide relatively great changes in B. The effects of eddy currents in the core, however, widen the loop as illustrated by hysteresis loop 64 of FIG. 14, and thus requires greater changes in H to produce corresponding changes in B obtained from hysteresis loop 63. It will be understood, of course, that a core material which provides relatively great changes in B for small changes in H is a material characterized by high initial permeability, and such a material is adapted to produce a high rate of change of flux as the material is driven through a hysteresis loop such as loop 64 of FIG. 14.

From the foregoing it should now be apparent that the sensitivity obtained from the magnetic amplifier depends upon the permeability of the material employed and the extent to which the deleterious effects of eddy currents in the cores have been eliminated. In practice, for example, it has been found that the sensitivity may be increased as the permeability is increased, and similarly, the sensitivity may be increased as the thickness of the laminations of the cores is decreased.

It has been discovered that maximum regeneration may be obtained without introducing instability when the exciting current is such as to produce a demagnetizing force H which is approximately equal to the coercive force of the magnetic material employed and that the coercive force bears a workable relation to the permeability of the material. Thus, in practice, in determining the wave form of the primary exciting current impulse for driving a given core material through a hysteresis loop of desired shape, the permeability of the core material may be taken as a measure of the coercive force and the wave form of the negative portion of the exciting current formed so as to provide a demagnetizing force corresponding approximately to the coercive force.

The negative portion of the exciting current impulse also preferably is highly damped in order that the eddy currents may be held to a minimum, particularly by reason of the fact that this portion of the exciting current impulse corresponds to the region 65 of hysteresis loop 64 during which the permeability changes most rapidly. The positive portion of the exciting current impulse preferably is of such amplitude as to drive the core material well into saturation whereby both cores of toroids T1 and T2 are driven into saturation for all values of signal currents applied.

Figure 10:
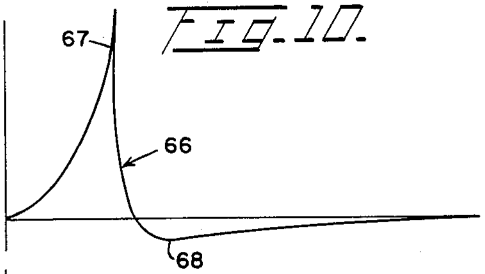

A primary exciting current impulse of suitable wave form for producing hysteresis loop 64 of FIG. 14 is illustrated in FIG. 10 and designated generally by the numeral 66. Current impulse 66 comprises a sharp positive peak portion 67 of sufficient amplitude to drive cores 28 of toroids T1 and T2 into saturation and further comprises a negative or tail portion 68 of amplitude sufficient to produce a demagnetizing force equal approximately to the coercive force of the material of the cores.

Current impulse 66 may be supplied by any device or circuit means adapted to produce the specific wave form of current impulse 66 and adapted to supply such impulse to the primary windings 37 of the toroids at a predetermined frequency such, for example, as three impulses per second. It will be understood that the frequency of the impulses, in any case, will be determined largely by the character of the signal current.

In the arrangement shown in FIG. 8, the current impulses 66 are supplied by the relaxation oscillator including tube V1 which may be of the same type as tubes V2 and V3 of firing mechanism 26. It will be understood that the magnetic amplifier preferably is included as a component of firing mechanism 26 and is disclosed separately therefrom in FIG. 8 for purposes of description only.

Prior to launching the mine within the water, a condenser 69 connected across the main gap of tube V1 is charged to the potential appearing across series connected resistors 71 and 72. Similarly, a condenser 73 connected across the control gap of tube V1 charges to the potential appearing across resistor 72, the junction of resistors 71 and 72 being connected to the control grid 54 of tube V1.

Resistors 71 and 72 together with resistors 74 and 75 comprise a voltage divider network which is connected across battery 27 between tap 76 and the low potential side thereof. The potentials thus applied across condensers 69 and 73 by the voltage divider network are of insufficient value to render tube V1 conductive. When the mine is launched, however, switch 46 of clock mechanism 25 is closed thereby to apply full battery potential across condenser 69 by way of the high potential side of battery 27, conductor 77, switch 46 of clock mechanism 25, conductor 78, and thence by way of resistor 74 to condenser 69.

As condenser 69 charges toward full battery potential, a potential is applied across the main gap of tube V1 sufficient to break down the main gap when the potential across condenser 73 is elevated to a value corresponding to the control gap breakdown potential of tube V1. As tube V1 is rendered conductive, the charge on condenser 69 is discharged therethrough by way of inductance 79 and plate 81 and cathode 82 of tube V1 and thereafter stored in condenser 83, the tube being extinguished when the voltage across condenser 69 falls below the main gap sustaining voltage of the tube.

Figure 9:
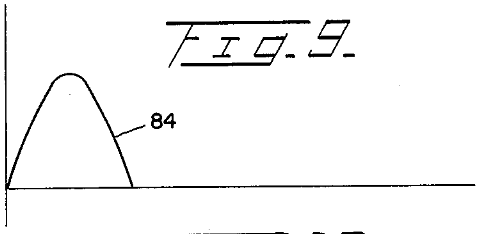
FIGS. 9 through 12 illustrate a group of curves of the electrical impulses which occur at various points in the magnetic amplifier.

Inductance 79 tends to produce an "overshoot" of current flow through tube V1 thereby to provide sufficient discharge of condenser 69 to insure extinction of the tube. Condenser 73 serves to supply sufficient energy to insure breakdown of the main gap of tube V1. The current impulse thus caused to flow through V1 is illustrated in FIG. 9 and designated by the numeral 84.

Upon extinction of tube V1, condenser 83 is discharged by way of two paths, one of which comprises a resistor 85 and the other of which comprises a condenser 86 in series with primary windings 37 of toroids T1 and T2, the latter path being of relatively low resistance and producing the positive peak portion 67 of current impulse 66 illustrated in FIG. 10. Discharge of condenser 86, however, is by way of resistor 85 and the primary windings 37 of toroids T2 and T1, and therefore, the tail portion 68 of current impulse 66 is highly damped. Thus, the value of resistor 85 controls the amplitude of tail portion 68 and also the amount of damping thereof.

The foregoing operations or unit cycles of operation of the relaxation oscillator are repeated each time the voltage across the control gap of tube V1 is elevated to the breakdown potential thereof, the R.C. constants of the charging circuits for condensers 69 and 73 being such as to cause periodic conduction of tube V1 at the aforesaid frequency of three times per second.

When the cores 28 of toroids T1 and T2 are equally magnetized by the primary current impulse 66, the cores produce substantially identical hysteresis loops 87 and 88 respectively, as illustrated in FIG. 15, these loops corresponding in shape to loop 64 of FIG. 14. In the event that the cores do not produce identical hysteresis loops in response to the primary exciting current impulse such that a voltage is caused to appear across combined secondary windings 38, the output voltage may be reduced substantially to zero by adjusting the wiper of variable resistor 61 to the right or to the left, as the case may be, as heretofore set forth.

Figure 13:
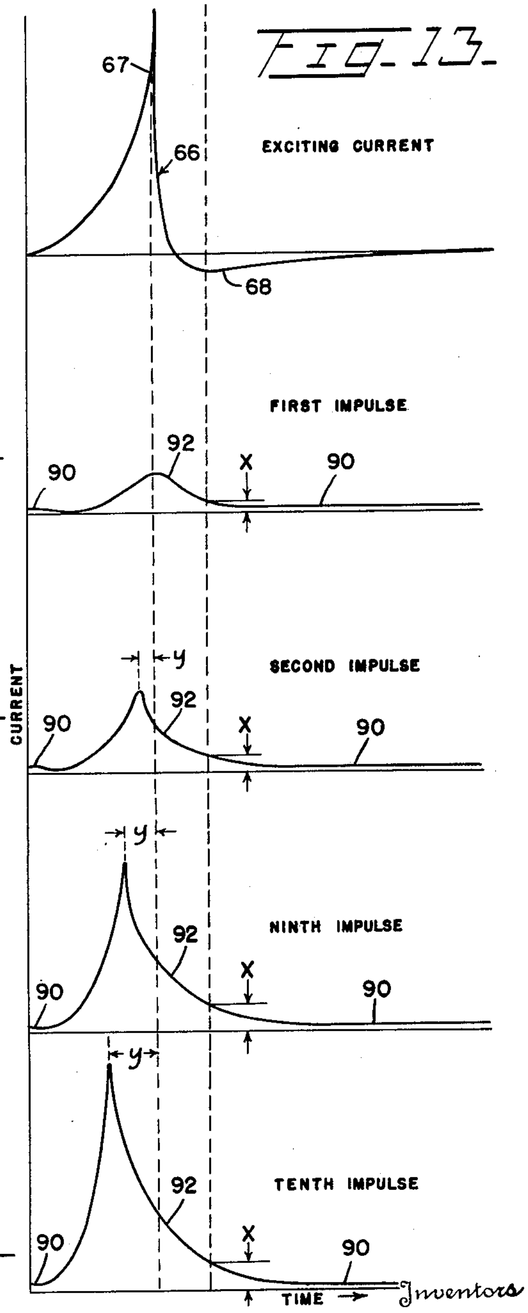
FIG. 13 is a diagrammatic view of a group of curves illustrating the increase in the secondary current and the phase relation between the exciting current impulse and variations in the secondary current impulses upon successive impulses of exciting current in response to a signal current applied to the magnetic amplifier.

When a signal current is received from search coil SC, the magnetization of the core of toroid T1, for example, is increased by a small amount above that of the core of toroid T2, and hysteresis loops 87 and 88 are caused to shift in phase and change in shape upon the next succeeding primary current impulse received from the relaxation oscillator. As the loops shift in phase and change in shape relative to each other, the difference in the relative rate of change of flux in the cores becomes a maximum when hysteresis loops 87 and 88 pass through points designated 89 and 91 of loops 87 and 88 respectively, which points correspond in point of time. Thus, a voltage of greater value is induced in one of the secondary windings 38 than in the other, and the difference in the secondary voltages causes a current to flow in the output circuit, the current developed being increased progressively upon successive impulses of the primary current and being illustrated in FIG. 13 and designated by the numeral 92.

It is evident from the shape of the hysteresis loops that the secondary current is in the direction of the signal, and consequently is regenerative, during that portion of the loops in the region of points 89 and 91 thereof. Accordingly, the output voltage of the amplifier reaches a maximum within this region of the loops. Over other regions of the loops, however, the secondary current is degenerative.

The upper half of the loops only are employed in order that the region of maximum change in permeability, designated at 65 in loop 64, may be utilized in effecting a maximum change in remanent flux from impulse to impulse of the primary current. By the expression remanent flux is meant the residual or remaining flux in the cores between exciting impulses.

The effect of the secondary current 92 is to aid the signal current in further shifting the phase and changing the shape of the loops such that at the termination of the first primary current impulse, loop 87 is terminated as at 193 with a substantially greater remanent flux in the core of toroid T1 and loop 88 is terminated as at 194 with a substantially lesser remanent flux than before application of the signal, as seen in FIG. 16 in which the dashed lines indicate the initial balanced shape of the loops as illustrated in FIG. 15.

Upon successive primary current impulses, the loops 87 and 88 progressively change in shape until a predetermined number of impulses, such, for example, as 10 impulses have been received. At such time, further increase in the secondary current is terminated, and the hysteresis loops 87 and 88, as seen in FIG. 17, thereafter are continually retracted as long as the signal current is received from search coil SC.

As loops 87 and 88 change progressively from impulse to impulse of the primary exciting current, the points 89 and 91 at which the secondary current 92 reaches maximum value, shift progressively nearer to the B axis. This is illustrated diagrammatically in FIG. 13 in which the letter $y$ illustrates the progressive shift in phase between the primary and secondary currents 66 and 92 respectively. The numeral 90 designates a signal current of constant value which is aided by the induced current 92 in unbalancing the toroids. The letter $x$ indicates the instantaneous value of induced current 92 which opposes the tail portion 68 of primary current 66 such that the remanent flux in the toroid of T1 is progressively increased by progressively smaller increments from impulse to impulse and aids the tail portion of the primary current with respect to toroid T2 such that the remanent flux of the core of toroid T2 is decreased progressively by progressively smaller increments from impulse to impulse. Thus, when the increase in $y$ becomes just sufficient to offset the increase in $x$, as controlled by the adjusted value of resistor 56 and the fixed value of resistor 57, the value of $x$ maintains a constant value upon further impulses of primary current and loops 87 and 88 maintain the shape illustrated in FIG. 17 as long as signal current is received from search coil SC. When the signal current is removed, however, the loops progressively revert to their initial shape after approximately 10 impulses from the relaxation oscillator.

Figure 11:
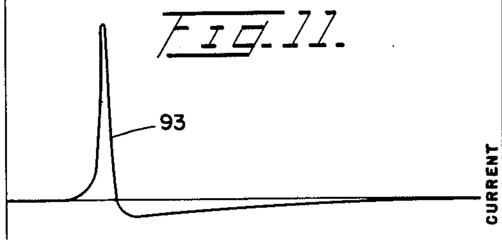
Figure 12:
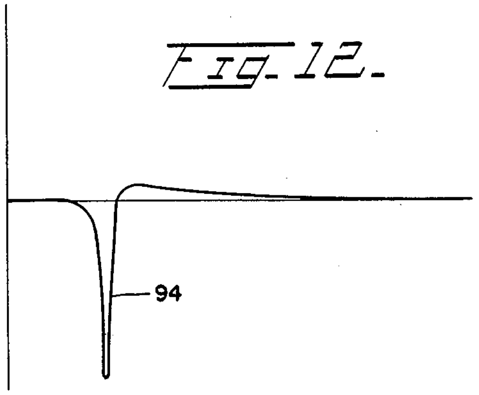
Figure 18:
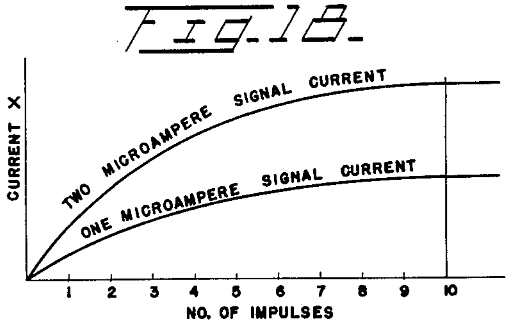
FIG. 18 is a group of curves illustrating diagrammatically the variation in a specific instantaneous value of the secondary current with variations in signal current.

The manner in which the instantaneous value $x$ of secondary current 92 increases from impulse to impulse upon the application of signal current from search coil SC is illustrated in FIG. 18. It will be noted that the constant value of $x$ attained when regeneration is terminated is a function of the magnitude of the signal current applied. Moreover, inasmuch as the value of $x$ is a measure of the regeneration attained, the amount of regeneration attained also is a function of the signal current. Accordingly, the amplitude of the output voltage, designated 93 in FIG. 11 for one polarity of signal current and designated 94 in FIG. 12 for a signal current of opposite polarity, is proportional to the magnitude of the signal current applied.

From the foregoing it should now be apparent that utilization of the inherent regenerative effects of the magnetic amplifier is made possible by the specific shape of hysteresis loops 87 and 88 and the manner in which the loops are caused to shift in phase during development thereof in response to each exciting current impulse whereby regeneration of the secondary current during a portion of the loops results in an output voltage of greater amplitude than would be obtained without such regenerative effects. Moreover, the secondary currents from impulse to impulse effect changes in the remanent flux in the cores such that a relative change in shape of the loops and consequent further shift in phase thereof is obtained gradually upon successive impulses of the primary current. The change in shape of the loops, however, effects the desired phase shift of the progressively increasing secondary currents with respect to the primary current impulses whereby further change in shape of the loops and regeneration of the secondary current may be terminated at maximum gain without producing an unstable circuit condition. Maximum regeneration also depends upon the value of resistor 57, as heretofore pointed out, instability being introduced when the value of the resistor is reduced below an optimum value.

From the foregoing the operation of the several parts of the mine firing control system of mine 20 should now be apparent. Accordingly, operation of such parts merely will be alluded to in the following statement of operation of the system in response to a vessel moving with respect to the mine.

Let it be assumed that the mine has been planted in a body of water and has come to rest on the bed thereof, and let it be assumed further that the extender and clock mechanisms 24 and 25 respectively have operated such that the mine is fully armed. A first signal generated by search coil SC in response to a vessel moving within the vicinity of the mine causes the magnetic amplifier, after approximately 10 impulses from the relaxation oscillator thereof, to produce an output voltage impulse such as 93 of FIG. 11, for example. This voltage impulse appears across winding 53 of transformer TC and initiates operation of tube V2, for example. A signal of opposite polarity generated by search coil SC in response to further movement of the vessel within the vicinity of the mine causes the magnet amplifier, after approximately 10 impulses of the relaxation oscillator, to produce the output voltage 94 of FIG. 12. This output voltage initiates operation of tube V3, and the additive voltage produced by the control channels individual to tubes V2 and V3 thereafter causes detonator 45 to be fired to explode the mine beneath a vulnerable portion of the vessel.

While the invention has been described in particularity with respect to a specific embodiment thereof adapted to fulfill the aforesaid objects of the invention, it will be apparent to those skilled in the art, after understanding the invention, that the same is susceptible of additional embodiments and modifications thereof without departing from the spirit and scope of the invention as defined by the appending claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a magnetic amplifier of the character disclosed, in combination, a pair of saturable magnetic cores, a primary winding on each core, means for applying a cyclically recurring current impulse having a sharp positive peak portion of sufficient amplitude to drive said cores into saturation and a negative portion of amplitude sufficient to produce a demagnetizing force approximately equal to the coercive force of the material of said cores for producing periodically a pair of substantially identical hysteresis loops of predetermined shape in said cores, means for producing an initial shift in phase and relative change in shape of the loops including a pair of secondary windings, one winding of said pair being disposed on a respective core, and a control source of polarity-reversible unidirectional voltages connected in series with said secondary windings, and regenerative circuit means connected across said windings and means responsive to said initial shift in phase and relative change in the shape of the loops for causing the initial change to be increased progressively to a limiting value as successive loops are produced following said initial change therein, said last named means thereafter being responsive to a change in the loops corresponding to a reversal of said initial shift in phase and relative change in shape therein for causing the loops to be changed in phase and shape progressively as successive loops are produced until the loops are again rendered substantially identical.

2. In a magnetic amplifier of the character disclosed, the combination of a core structure having at least two matched magnetic circuits, an output circuit including a pair of opposedly connected windings respectively associated with said magnetic circuits, a regeneration circuit operatively associated with said output circuit, means for periodically magnetizing the magnetic circuits with a common current impulse of predetermined wave form such that equal voltage impulses are induced in said windings in response to the common current impulses, means for initially producing a change in the relative magnetization of said magnetic circuits such that a difference in said voltage impulses is produced and progressively increasing current impulses adapted further to change the relative magnetization of the magnetic circuits are caused to flow in the output circuit in response to successive impulses of said common current whereby regeneration of said voltage difference is produced in said regeneration current, said regeneration being effective through said regeneration circuit to progressively increase the shift in phase between said common and output circuit current impulses until the shift in phase is just sufficient to offset a further increase in the output current impulse, and impedance means included in said regeneration circuit and settable at will for controlling said shift in phase whereby the regeneration may be regulated to predetermine the gain of the amplifier.

3. A magnetic amplifier of the type disclosed, comprising a pair of saturable magnetic cores, a primary winding on each core, means for energizing said primary windings by a cyclically recurring current impulse having a sharp positive peak portion of sufficient amplitude to drive said cores into saturation and a negative portion of amplitude sufficient to produce a demagnetizing force approximately equal to the coercive force of the material of said cores to produce a varying magnetic flux in each core, a secondary winding on each core, said secondary windings being connected in series opposing relation so as to produce opposing output voltages in response to said varying magnetic flux, a control source connected across said secondary windings to apply a control signal thereto for changing the phase and shape of the hysteresis loops of said cores relative to one another whereby a change in the resultant output voltage of said series connected secondary windings is produced, and positive feedback means including a stabilizing resistor and an adjustable resistor connected across said secondary windings to produce a regenerative current in said secondary windings in response to the change in resultant output voltage and thereby increase the sensitivity of the magnetic amplifier.

4. A magnetic amplifier as recited in claim 3, including an adjustable selectable polarity direct-current supply circuit connected to pass current of selectively predetermined polarity through said secondary windings, means for rendering said hysteresis loops substantially identical under no-control signal conditions whereby the inherent difference in hysteresis in said saturable magnetic cores is effectively eliminated.

References Cited in the file of this patent

UNITED STATES PATENTS

| | | |
|---|---|---|
| 1,544,381 | Elmen et al. | June 30, 1925 |
| 1,586,889 | Elmen | June 1, 1926 |
| 1,645,302 | Slepian | Oct. 11, 1927 |
| 1,784,879 | Peterson | Dec. 16, 1930 |
| 1,847,079 | Burton | Mar. 1, 1932 |
| 1,884,845 | Peterson | Oct. 25, 1932 |
| 2,164,383 | Burton | July 4, 1939 |
| 2,259,711 | Stevens et al. | Oct. 21, 1941 |